United States Patent
Liu

(10) Patent No.: US 11,822,287 B1
(45) Date of Patent: Nov. 21, 2023

(54) BINOCULAR HOLOGRAPHIC MACHINE VISION SYSTEM AND METHOD FOR IDENTIFYING LOCATIONS OF TARGET ELEMENTS

(71) Applicant: Chris Hsinlai Liu, Singapore (SG)

(72) Inventor: Chris Hsinlai Liu, Singapore (SG)

( * ) Notice: Subject to any disclaimer, the term of this patent is extended or adjusted under 35 U.S.C. 154(b) by 0 days.

(21) Appl. No.: 18/297,061

(22) Filed: Apr. 7, 2023

(30) Foreign Application Priority Data

Aug. 1, 2022 (SG) .......................... 10202250644H

(51) Int. Cl.
*G03H 1/04* (2006.01)
*G03H 1/22* (2006.01)
*G03H 1/08* (2006.01)

(52) U.S. Cl.
CPC ......... *G03H 1/0406* (2013.01); *G03H 1/0402* (2013.01); *G03H 1/0866* (2013.01); *G03H 1/2202* (2013.01); *G03H 2001/0428* (2013.01); *G03H 2001/0883* (2013.01)

(58) Field of Classification Search
CPC .. G03H 1/2294; G03H 1/0443; G03H 1/0005; G03H 2210/30; G03H 1/0866; G03H 1/08; G03H 1/268; G03H 1/2249; G03H 2222/34; G03H 1/0248; G03H 1/16; G03H 1/02; G02B 5/32; G02B 2027/0174; G02B 27/0103
See application file for complete search history.

(56) References Cited

U.S. PATENT DOCUMENTS

| 3,598,484 | A | 8/1971 | Newbury et al. | |
| 2019/0121292 | A1 | 4/2019 | Kim et al. | |
| 2019/0286053 | A1* | 9/2019 | Ozcan | H04N 23/951 |
| 2021/0191321 | A1* | 6/2021 | Christmas | G03H 1/22 |

FOREIGN PATENT DOCUMENTS

| CN | 109323665 | 2/2019 |
| CN | 112525104 | 11/2021 |

OTHER PUBLICATIONS

Intellectual Property Office of Singapore Examination Report, issued in Application No. 10202250644H, dated Oct. 19, 2022.
Intellectual Property Office of Singapore Search Report, issued in Application No. 10202250644H, dated Oct. 18, 2022.
Intellectual Property Office of Singapore Notice of Eligibility of Grant, issued in Application No. 10202250644H, dated Oct. 21, 2022.

* cited by examiner

*Primary Examiner* — Farhan Mahmud
(74) *Attorney, Agent, or Firm* — BakerHostetler

(57) ABSTRACT

The present disclosure describes binocular machine vision systems and methods for determining locations of target elements. This disclosure describes the transformation of multiple 2D sensor data into 3-dimensional position and employs the full range of through-focus imaging using a single image for each Receptor.

12 Claims, 7 Drawing Sheets

BINOCULAR HOLOGRAPHIC MACHINE VISION SYSTEM AND METHOD FOR IDENTIFYING LOCATIONS OF TARGET ELEMENTS

CROSS-REFERENCE TO RELATED APPLICATION

This application claims priority to Singapore Application No. 10202250644H filed Aug. 1, 2022, the entire disclosure of which is incorporated herein by reference.

FIELD OF INVENTION

The present invention relates to the field of binocular machine vision systems and methods for determining locations of target elements. This invention transforms multiple 2D sensor data into 3-dimensional position and employs the full range of through-focus imaging using a single image for each Receptor.

SUMMARY OF PRIOR ART

Mechanical processing without visual feedback in the sub-micron range requires extensive fastening. Job shop type of process cannot afford the time and costs on fastening, hence sharper visual feedback is a must for processing with submicron precisions. Since focusing is achieved via mechanical positioning of lens, hysteresis and displacement contributes to errors and non-repeatability. Another issue that is faced by those skilled in the art is the issue of simultaneous focusing, that is, the processing of a sequence of focusing for iterative correction or for multiple-target view. If the object item is in motion, prior knowledge on focusing is no longer valid.

As a result, it is desirable to utilize holographic images for this purpose as such holographic images are frozen in time thereby effectively resolving the issues above.

Digital holography offers an efficient way for a three-dimensional image to be captured and processed and usually comprises of two stages: the stage of generating the hologram and the stage of reconstructing the hologram. In the first stage, light reflected from a three-dimensional object through a holographic system is recorded on a holographic medium and in the second stage, a holographic image is reconstructed based on the information recorded in the holographic medium. In digital holography, a hologram, such as a digital Fresnel hologram, is usually generated optically on the holographic medium based on three-dimensional objects, then digitally processed and reconstructed In a digital Fresnel holographic system, a waveform reflected off an object is superimposed with a second waveform thereby generating interference patterns that are then projected onto a physical medium to be recorded. The interference pattern formed on the recording medium may be in the form of Fresnel rings that represent each and every point at every plane of the three-dimensional object that is being captured. These image receptors may comprise digital sensor arrays which are made up of CMOS or similar devices.

The depth of the points is encoded by the density of the rings such that points which are closer to the system project less dense rings than distant points. Because of this encoding method, information about the volume being imaged is recorded into the recording medium.

Current experimental measurements result in a resolution of two microns while sensor cell sizes are significantly larger than that. When hundreds of Fresnel Zone rings are collected, the resolution may be improved by an order of magnitude. However, off-axis Holography would not be practical for traditional large feature size sensor cells since the fringe distances can easily be smaller than 10 microns and become unreadable. If digital camera sensor cell size were decreased to sub-micron levels, off-axis measurements would become practical. When further augmented with integration over a range of z values, the integrated data further improves the precision for finding the Fresnel Zone centre.

The flatness of an image receptor is crucial and has to be well controlled or selected to prevent imaging errors from occurring. When the surface or plane of a-receptor is not flat, this will cause an inaccurate number of Fresnel zone rings to form on the surface of the image receptor. For example, it was found that for every 0.5 micron increase in the convexity of the surface, this in turn causes the number of Fresnel zone rings to reduce by 1. This causes the holographic image for the target centre to be lowered by about 1.5 millimetres. This is based on a set up whereby the distance z between the target and the receptor is 200 millimetres and the receptor's width is about 10 millimetres.

Further, if the convexity of the surface was non-uniformed, this would cause the Fresnel zone rings to form in an uneven manner. All these flaws then result in inaccurate representations of the distance between the target image and the receptor, i.e. in a z-direction. This is illustrated in FIG. 2 which shows the effect that convex surface 204 has on the generation of Fresnel zone rings 206 when a image of target 202 is projected onto surface 204 through a Fresnel zone plate. As can be seen, when the convexity of the surface increases, such as surface 210, the uniformity of Fresnel zone rings 212 decreases accordingly. The top view of such unevenly formed Fresnel zone rings 228 are also illustrated in FIG. 2.

There are major issues on digital holographic machine vision that have to be addressed before digital holographic machine vision may be employed across various fields with minimal errors, speedy handling, and increased efficiencies and reduced costs.

SUMMARY OF INVENTION

The above and other problems are solved and an advance in the art is made by systems and method provided by embodiments in accordance with the invention.

A first advantage of embodiments of the invention is that the invention negates the need for existing focusing mechanisms associated with existing machine vision systems as the holographic receptors are able to utilize their full image capturing ranges to identify the location of targets.

A second advantage of embodiments of the invention is that the invention is able to accommodate for any unevenness at the plane or surface of the holographic image receptors.

In accordance with a first aspect of the invention, a system for determining, in a first and a second holographic image receptors' common three-dimensional (x, y, z) coordinate system, position of a point source provided within the first and second holographic image receptors' field of view is disclosed, the system comprising: the first holographic image receptor being configured to reconstruct a holographic image of the point source, whereby the holographic image corresponds to a two-dimensional location $(s_1, t_1)$ on the plane of the first holographic image receptor; the second holographic image receptor being configured to reconstruct a holographic image of the point source, whereby the holographic image corresponds to a two-dimensional location $(u_1, v_1)$ on the plane of the second holographic image receptor; a computing device communicatively coupled to the first and second holographic image receptors, the computing device being configured to: identify, based on a calibration table of the first holographic image receptor and on a calibration table of the second holographic image receptor, a location $(x_1, y_1, z_1)$ in the three-dimensional coordinate system that matches with the two-dimensional location $(s_1, t_1)$ on the plane of the first holographic image receptor and the two-dimensional location $(u_1, v_1)$ on the plane of the second holographic image receptor, whereby the location $(x_1, y_1, z_1)$ corresponds to the position of the point source, wherein each holographic image receptor's calibration table was pre-generated by, positioning a calibration point source at a plurality of calibration positions from the first and second holographic image receptors, whereby at each calibration position, the first and second holographic image receptors are configured to: reconstruct a holographic image of the calibration point source on each image receptor's plane; and for each image receptor, associate, in each image receptor's calibration table, a two-dimensional location of the holographic image on the plane of the image receptor with a location of the calibration point source as defined in the first and the second holographic image receptors' common three-dimensional (x, y, z) coordinate system.

With regard to the first aspect of the invention, a point of origin of the first and a second holographic image receptors' common three-dimensional (x, y, z) coordinate system is a fixed point provided between the first and second holographic image receptors.

With regard to the first aspect of the invention, the first holographic image receptor is configured to define an axis across the plane of the first holographic image receptor, whereby the two-dimensional location on the plane of the first holographic image receptor is defined as a point that has a shortest distance from the point source to the axis of the plane of the first holographic image receptor.

With regard to the first aspect of the invention, the reconstructing of the holographic image of the point source by the first holographic image receptor comprises the first holographic image receptor being configured to: represent the holographic image by layers of 2D images in a z axis of the first holographic image receptor, with centres of the layers of 2D images averaged into a two-dimensional location on the plane of the first holographic image receptor.

With regard to the first aspect of the invention, the reconstructing of the holographic image of the point source by the second holographic image receptor comprises the second holographic image receptor being configured to: represent the holographic image by layers of 2D images in a z axis of the second holographic image receptor, with centres of the layers of 2D images averaged into a two-dimensional location on the plane of the second holographic image receptor.

With regard to the first aspect of the invention, the second holographic image receptor is configured to define an axis across the plane of the second holographic image receptor, whereby the two-dimensional location on the plane of the second holographic image receptor is defined as a point that has a shortest distance from the point source to the axis of the plane of the second holographic image receptor.

In accordance with the second aspect of the invention, a method for determining, in a first and a second holographic image receptors' common three-dimensional (x, y, z) coordinate system, position of a point source provided within the first and second holographic image receptors' field of view is disclosed, the method comprising the steps of: reconstructing, using the first holographic image receptor, a holographic image of the point source, whereby the holographic image corresponds to a two-dimensional location $(s_1, t_1)$ on the plane of the first holographic image receptor; reconstructing, using the second holographic image receptor, a holographic image of the point source, whereby the holographic image corresponds to a two-dimensional location $(u_1, v_1)$ on the plane of the second holographic image receptor; identifying, using a computing device communicatively coupled to the first and second holographic image receptors, based on a calibration table of the first holographic image receptor and on a calibration table of the second holographic image receptor, a location $(x_1, y_1, z_1)$ in the three-dimensional coordinate system that matches with the two-dimensional location $(s_1, t_1)$ on the plane of the first holographic image receptor and the two-dimensional location $(u_1, v_1)$ on the plane of the second holographic image receptor, whereby the location $(x_1, y_1, z_1)$ corresponds to the position of the point source, wherein each holographic image receptor's calibration table was pre-generated by, positioning a calibration point source at a plurality of calibration positions from the first and second holographic image receptors, whereby at each calibration position, the first and second holographic image receptors are configured to: reconstruct a holographic image of the calibration point source on each image receptor's plane; and for each image receptor, associate, in each image receptor's calibration table, a two-dimensional location of the holographic image on the plane of the image receptor with a location of the calibration point source as defined in the first and the second holographic image receptors' common three-dimensional (x, y, z) coordinate system.

With regard to the second aspect of the invention, a point of origin of the first and a second holographic image receptors' common three-dimensional (x, y, z) coordinate system is at a fixed point between the first and second holographic image receptors.

With regard to the second aspect of the invention, the first holographic image receptor is configured to define an axis across the plane of the first holographic image receptor, whereby the two-dimensional location on the plane of the first holographic image receptor is defined as a point that has a shortest distance from the point source to the axis of the plane of the first holographic image receptor.

With regard to the second aspect of the invention, the second holographic image receptor is configured to define an axis across the plane of the second holographic image receptor, whereby the two-dimensional location on the plane of the second holographic image receptor is defined as a point that has a shortest distance from the point source to the axis of the plane of the second holographic image receptor.

With regard to the second aspect of the invention, the reconstructing of the holographic image of the point source by the first holographic image receptor comprises the first holographic image receptor being configured to: represent the holographic image by layers of 2D images in a z axis of the first holographic image receptor, with centres of the layers of 2D images averaged into a two-dimensional location on the plane of the first holographic image receptor.

With regard to the second aspect of the invention, the reconstructing of the holographic image of the point source by the second holographic image receptor comprises the second holographic image receptor being configured to: represent the holographic image by layers of 2D images in a z axis of the second holographic image receptor, with centres of the layers of 2D images averaged into a two-dimensional location on the plane of the second holographic image receptor.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a binocular holographic machine vision system that may be used to replace focusing mechanisms that are commonly found in traditional stereo computer vision systems.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not been described in detail and the reader will be referred to a corresponding citation so as to not obscure the present invention unnecessarily.

It should be appreciated that the described binocular holographic machine vision solutions can be applied toward any navigation processes including any traditional tasks that may be carried out using computer vision. This invention is not restricted to manufacturing or instrumentation settings only and can be employed in various other areas.

Holographic Image Receptors

Figure 1:
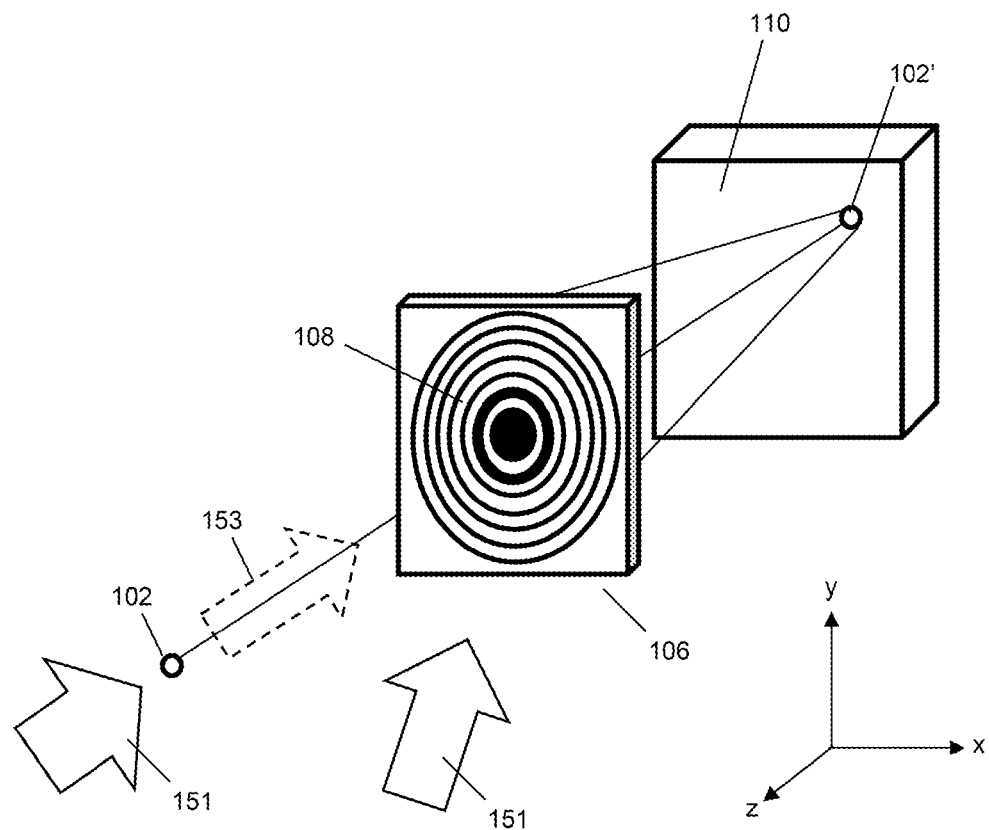
FIG. 1 illustrating a setup for the generation and reconstruction of a Fresnel hologram of an object in accordance with embodiments of the invention.

FIG. 1 illustrates an exemplary digital holography system that comprises of two stages: the stage of generating the hologram and the stage of reconstructing the hologram, i.e., a three-dimensional image of an object.

In the first stage, an illumination laser beam 151 is used to illuminate three-dimensional object 102. The light reflected or scattered by object 102 forms object beam 153 that is projected onto a surface of image receptor 106. Simultaneously, the illumination beam 151 is also projected onto the surface of image receptor 106. In an embodiment of the invention, the resulting pattern (which is a result of object beam 153 and illumination beam 151 intersecting and interfering with each other) that forms on image receptor 106 is Fresnel zone plate 108 (made up of a set of Fresnel zone rings). One skilled in the art will recognize that other types of patterns may be formed on image receptor 106 without departing from this invention.

Hence, in this arrangement, object 102 acts as a point source that may be used to generate a Fresnel zone plate or a pattern on a surface of an image receptor when the image receptor is illuminated with the object beam and the illumination beam associated with the point source. It should also be noted that the Fresnel zone rings comprise lighted zones and dark zones that alternate with each other.

In the following description, when reference is made to a point source, one skilled in the art will recognize that it refers to a source that is illuminated with an illumination beam to project an object beam onto a surface of an image receptor and at the same time, an illumination beam is also projected on the surface of an image receptor so that these two beams intersect and interfere to form a pattern that is associated with the source at the surface of the image receptor whereby the pattern may comprise, but is not limited to, a Fresnel zone plate.

Computer 110, which may be provided within image receptor 106 or independently from image receptor 106, is then used to digitally process the patterns captured by image receptor 106 so that a three-dimensional image of object 102 may be reconstructed in computer 110 as object 102'. It should be noted that when object 102' is reconstructed, computer 110 will reconstruct object 102' at a position that is at a fixed 3-dimensional location relative to the global coordinate (for now assigned at the centre of the receptor). In other words, if object 102 is provided at a (x, y, z) coordinate of (4, 6, 7) relative to the global coordinate, reconstructed three-dimensional object 102' can be at (4, 6, 7) relative to a new coordinate, which is at a fixed axis translations and rotations, as can be assigned by the reconstruction transformation. The results can always be inversed to a three-dimensional representation relative to the global coordinate. Hence for simplicity in concept and in computation, we may regard the image of the object be at (4, 6, 7), coinciding with the actual object as if this were in-axis holography. By the same token, we may further translate the image to (4, 6, 0) as if it were on the Receptor surface. As the detailed workings of a digital holography system is known in the art, e.g., Fresnel digital holography, the detailed workings of this holographic system are omitted for brevity.

Figure 2:
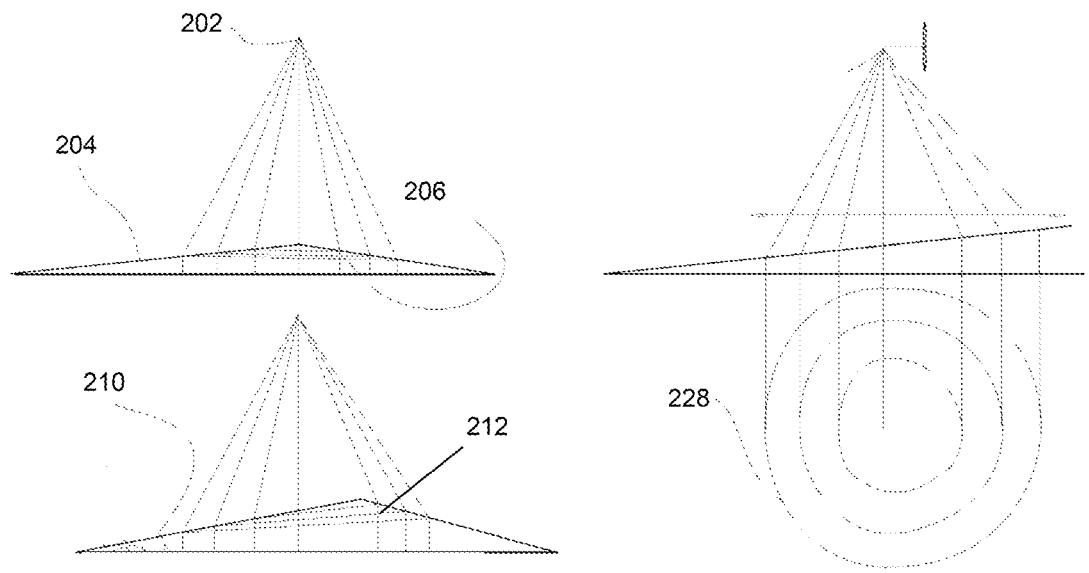
FIG. 2 illustrating the effect of convex surface profiles of an image receptor on Fresnel zone rings.

As shown in FIG. 2, when the surface of the image receptor is uneven, the Fresnel zone rings would be projected onto the image receptor in an uneven manner. Hence, in accordance with embodiments of the invention, the holographic image receptors will have to be calibrated so that the unevenness of the planes or surfaces of the image receptors may be compensated for.

Individual holographic image receptors may comprise, but are not limited to, a holographic image receptor device having conventional image sensors (charge coupled device image sensors, complementary metal-oxide semiconductor sensors, etc.) which react to detect and capture patterns on its surface such as Fresnel zone rings (comprising alternating light and dark zones) projected on its surface. Such image receptors may then be utilized in the binocular holographic machine vision system.

Figure 3:
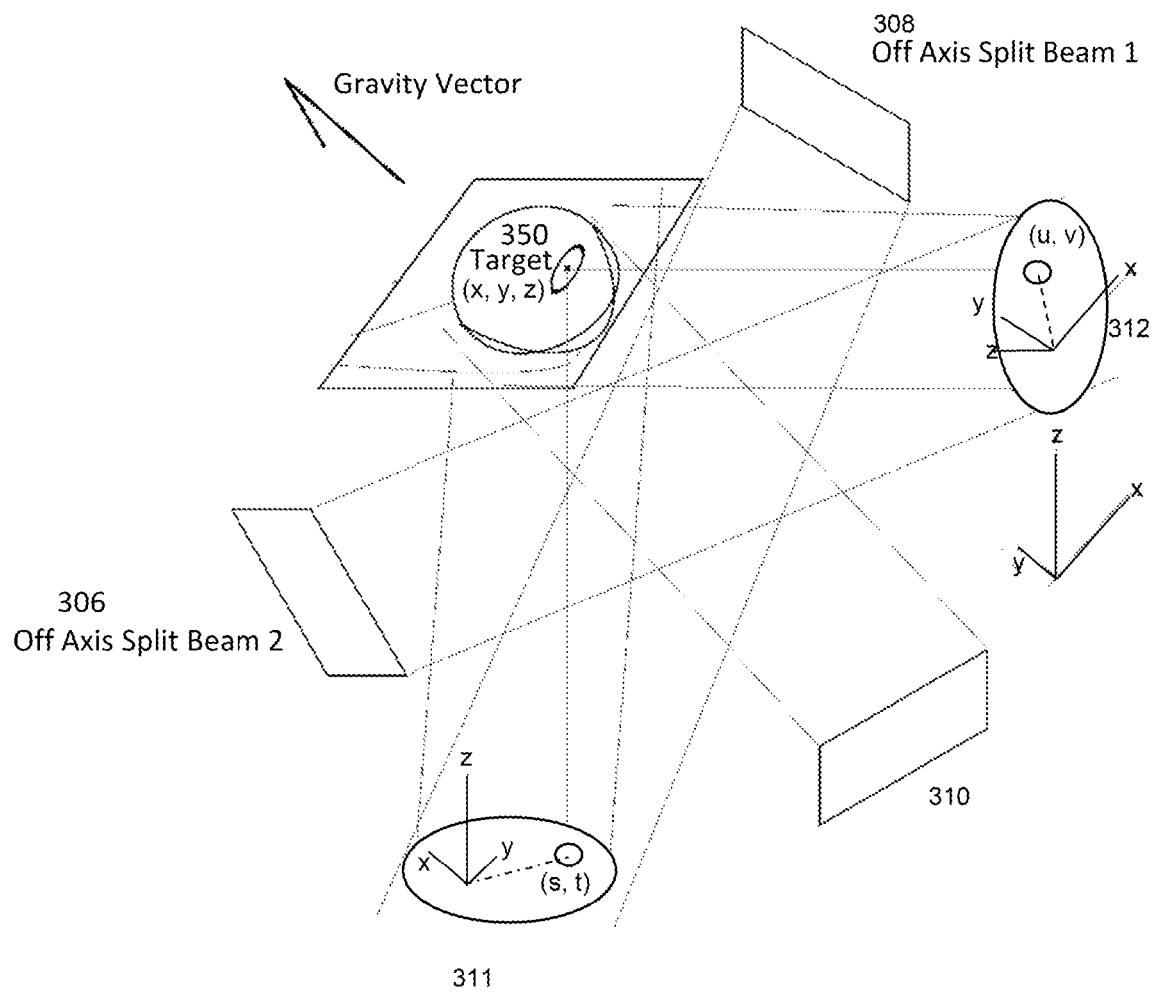
FIG. 3 illustrating a setup for applying binocular holographic machine vision in accordance with embodiments of the invention.

An exemplary calibration setup for image receptors 311 and 312 is illustrated in FIG. 3. As shown in FIG. 3, an illumination laser beam 310 is used to illuminate object 350. The light reflected or scattered by object 350 forms object beams that are projected onto the surfaces of image receptors 311 and 312. Simultaneously, the illumination beam 310 is split into two beams, beams 306 and 308, which are in-phase with illumination beam 310. Beams 306 and 308 are then projected onto the surface of image receptors 312 and 311 respectively. Corresponding patterns (which are a result of the object beam and beams 311 and 312 intersecting and interfering with each other) then form on image receptors 311 and 312.

Image receptors 311 and 312 then utilize these patterns to reconstruct a holographic image of object 350 at their specific locations. In embodiments of the invention, image receptors 311 and 312 are configured to reconstruct the holographic image of object 350 that overlaps onto the object via coordinate rotation. The image centres are represented as (x, y, z) in the coordinate system of each receptor.

Figure 5:
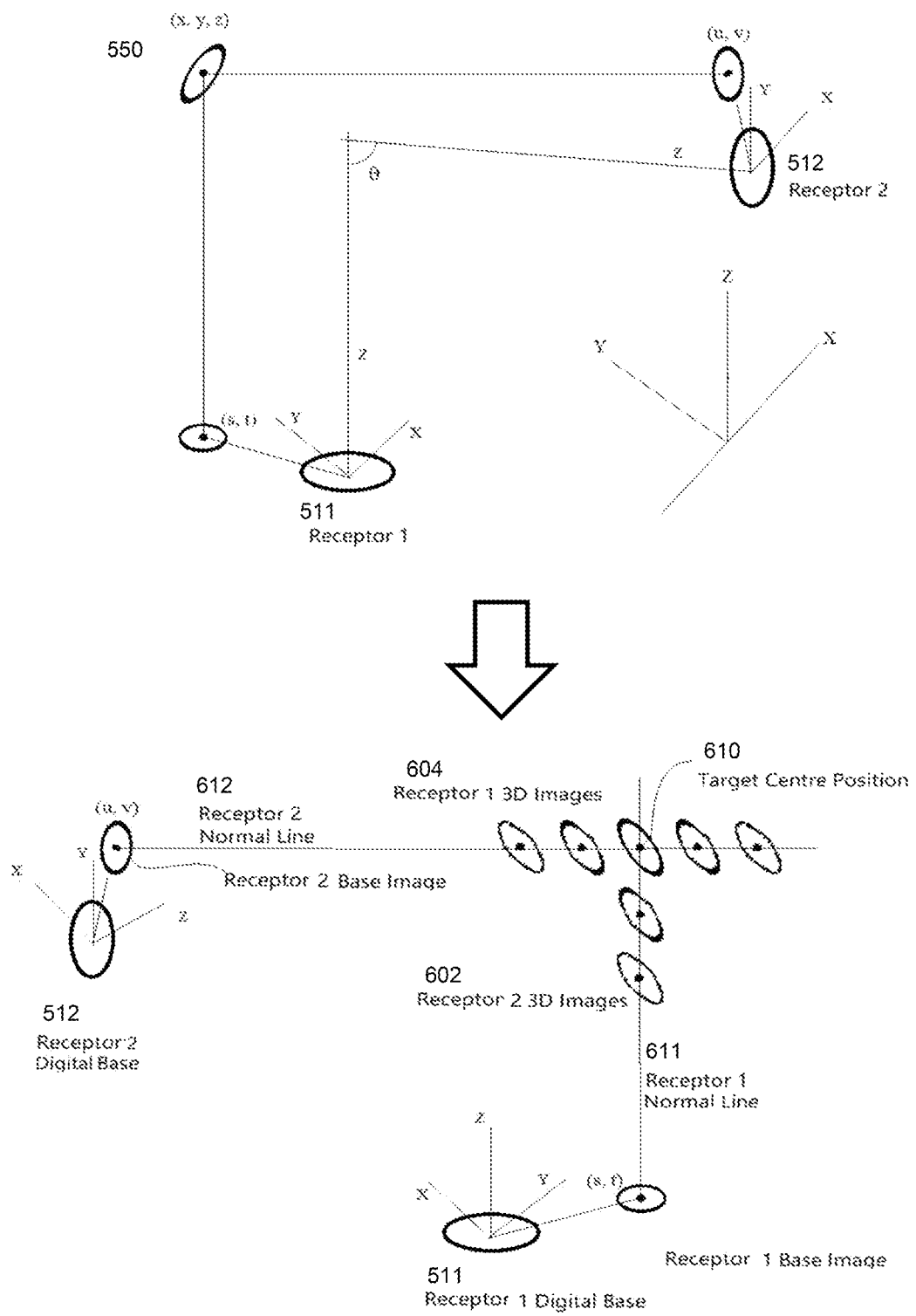
FIG. 5 illustrating an arrangement for identifying the location of a target object based on the binocular holographic machine vision process in accordance with embodiments of the invention.

With reference to FIG. 5, it can be seen that the layers of 2D object images from receptor 511 align in the z direction of receptor 511 and are shown as images 604. The average of x and y values for the centres of the layers of 2D images in the z direction corresponding to receptor 511 are employed as (s, t) for the point of object 350 on the plane of receptor 511. The average x and y values for the centres of the layers of 2D images in the z direction corresponding to receptor 512 are employed as (u, v) for the point of object 350 on the plane of receptor 512. By doing so, the system generates the pair of 2D coordinates on the plane of receptor 511 and receptor 512, respectively. It is useful to note that the (s, t) and (u, v) values coincide with the Fresnel Zone Centres of the respective receptors.

For example, with reference to FIG. 3, a calibration point (x, y, z) on object 350 may generate a (s, t) value for a point on object 350 on the plane of receptor 311 and generate a (u, v) value on the plane of receptor 312, in accordance with the coordinates of the respective receptors. The detailed reconstruction of the layers of 2D Holographic images of object 350 of the receptors are omitted for brevity as the reconstruction of holographic images from captured patterns are known in the art.

Figure 4:
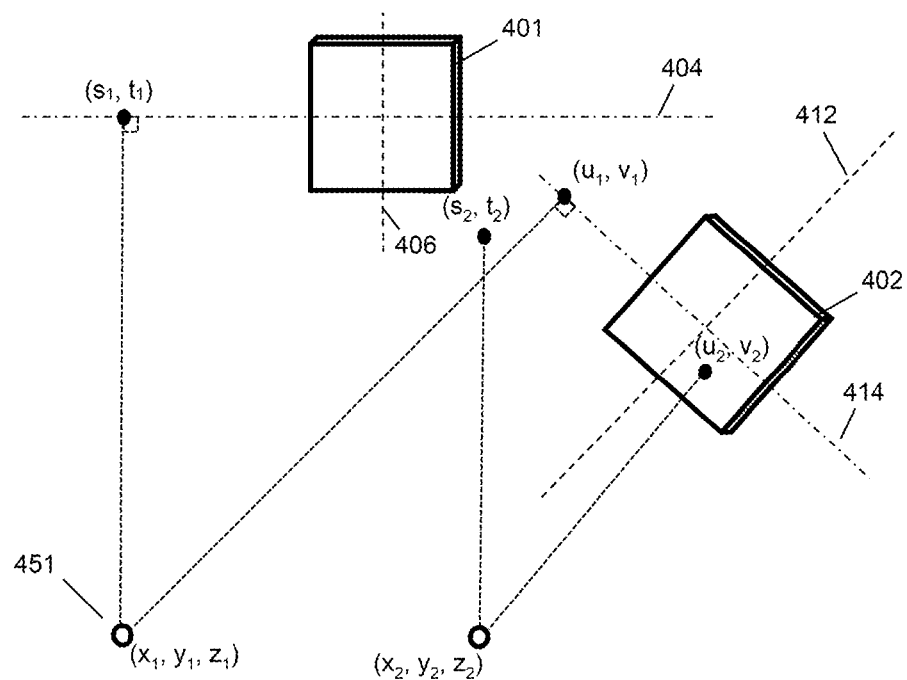
FIG. 4 illustrating the calibration of a pair of image receptors in accordance with embodiments of the invention.

A calibration or look-up table may then be constructed for a pair of image receptors based on the setup illustrated in FIG. 4. In accordance with embodiments of the invention, the calibration table for the pair of image receptors may be constructed as follows.

The pair of image receptors i.e., receptors 401 and 402, are first configured to be at a fixed position and alignment relative to each other. Once these two receptors have been calibrated, the positions and alignments of these two receptors (relative to each other) should no longer be adjusted as this would affect the results of the calibration table.

Once the positions of receptors 401 and 402 have been fixed, point source 451 is then positioned at a first known location $(x_1, y_1, z_1)$. It should be noted that the point of origin (0, 0, 0) of the three-dimensional coordinates (x, y, z,) (or global coordinates) may be set to be at any location relative to receptor 401 alone, to receptor 402 alone, or to both receptors 401 and 402 without departing from this invention. For example, the point of origin of the three-dimensional coordinates may be set to be at the geometric centre of receptor 401 and/or at the geometric centre of receptor 402, or at a specific point between receptors 401 and 402, e.g., the midpoint between these two receptors, or at any other location provided that each of receptors 401 and 402 are able to reliably ascertain the location of the point source when provided with the three-dimensional coordinates of the point source.

Point source 451 then causes patterns to be formed on receptors 401 and 402. Receptors 401 and 402 will then utilize existing holographic regeneration techniques to reconstruct the holographic image of point source 451. The average centre finding method described above shall cause point source 451 to cast points onto the respective planes of receptors 401 and 402. For example, the relevant plane of receptor 401 may be defined by horizontal axis 404 and vertical axis 406, which pass through the centre of the receptors, while the relevant plane of receptor 402 may be defined by vertical axis 412 and horizontal axis 414. One skilled in the art will recognize that other planes may be utilized by receptors 401 and 402 without departing from the invention and various axes may be defined as required.

In the example illustrated in FIG. 4, it is shown that receptor 401 reconstructed a corresponding point (or two-dimensional location) at a location $(s_1, t_1)$ on its plane while receptor 402 reconstructed a corresponding point at a location $(u_1, v_1)$ on its plane. The point of origins for the two-dimensional coordinates (s, t) of receptor 401 and (u, v) of receptor 402 are left as design choices to one skilled in the art. In embodiments of the invention, the point of origins may be taken to be the centre of the respective receptors 401 and 402. Note that the establishment of such (s, t) (u, v) values above is via a fixed translation and rotation of axis which is fixed throughout the calibration and positioning procedures.

In further embodiments of the invention, a corresponding point at a location (s, t) and/or (u, v) may be defined as a point that is perpendicular from the plane of receptor 401 or 402 to the point source (or target object). Such an embodiment is illustrated in FIG. 4 where location $(s_1, t_1)$ represents a corresponding point on a plane of receptor 401 whereby this point is an intersection between the receptor plane and a perpendicular line from the point source. Similarly, location $(u_1, v_1)$ represents a corresponding point on a plane of receptor 402 whereby this point is an intersection between the receptor plane and a perpendicular line from the point source.

In embodiments of the invention, each of the receptors may be configured to define a plane of image receptor which minimizes the average distance from the surface of each of the image receptors to the point source. The corresponding two-dimensional location on the plane of receptor 401 may then be defined as a point that has a shortest distance from the point source 451 to the plane of receptor 401, and similarly, the corresponding two-dimensional location on the plane of receptor 402 may then be defined as a point that has a shortest distance from the point source 451 to the plane of receptor 402.

In embodiments of the invention, each of the receptors may be configured to define an axis across the plane of each of the image receptors. The corresponding two-dimensional location on the plane of receptor 401 may then be defined as a point that has a shortest distance from the point source 451 to the axis of the plane of receptor 401, and similarly, the corresponding two-dimensional location on the plane of receptor 402 may then be defined as a point that has a shortest distance from the point source 451 to the axis of the plane of receptor 402.

The $(s_1, t_1)$ and $(u_1, v_1)$ locations corresponding to point source 451's coordinates $(x_1, y_1, z_1)$ are then recorded into a database device (not shown) that is communicatively connected to receptors 401 and 402.

Point source 451 is then moved to a new location $(x_2, y_2, z_2)$ and the steps above are then repeated. At point source 451's new location, it is shown that receptor 401 reconstructed a corresponding point at a location $(s_2, t_2)$ on its plane while receptor 402 reconstructed a corresponding point at a location $(u_2, v_2)$ on its plane. The $(s_2, t_2)$ and $(u_2, v_2)$ locations corresponding to point source 451's coordinates $(x_2, y_2, z_2)$ are then recorded into the database device as shown in Table 1 below (for the two locations of point source 451).

TABLE 1

| Receptor 401 | Receptor 402 | Three-dimensional coordinates |
| --- | --- | --- |
| $(s_1, t_1)$ | $(u_1, v_1)$ | $(x_1, y_1, z_1)$ |
| $(s_2, t_2)$ | $(u_2, v_2)$ | $(x_2, y_2, z_2)$ |

The steps above are then repeated for all or most of the locations of point source 451 that fall within the field of view of receptors 401 and 402. Once all the respective $(s, t)$ and $(u, v)$ coordinates associated with point source 451's three-dimensional coordinates $(x, y, z)$ have been recorded and added into a look-up table in the database device, the look-up table in the database device would have been populated with the various $(s, t)$ and $(u, v)$ readings along with their associated $(x, y, z)$ coordinates In embodiments of the invention, point source 451 is provided at 20 cm away from either receptor 401 or 402.

Once the look-up table in the database device has been set up, calibrated receptors 401 and 402 may then be used to obtain the three-dimensional positions of point sources that fall within the field of view of these two receptors.

3 D Positioning by Matching

In embodiments of the invention, the 3-dimensional position of point sources may be obtained by matching. As illustrated in FIG. 5, point source 550 is placed within the field of view of image receptors 511 and 512. The machine vision system's goal herein is to then locate the position of point source 550 relative to the pair of image receptors, under the condition that the two image receptors have been calibrated as described in the previous section.

Using a systematic search methodology, the $(x, y, z)$ coordinates of point source 550 may be obtained or interpolated based on $(s, t)$ and $(u, v)$ readings as stored in the look-up table. As such a point exists in the calibration table; a sweep may be done through the look-up table to identify $(x, y, z)$ coordinates that match with the $(s, t)$ values obtained by receptor 511 and the $(u, v)$ values obtained by receptor 512.

From FIG. 5, it can be seen that a single $(s, t)$ point may be associated with multiple $(x, y, z)$ coordinates, i.e., images 602. Hence, image receptor 511 will retrieve from the look-up table the $(s, t)$ points and their associated $(x, y, z)$ coordinates. Similarly, it can be seen that a single $(u, v)$ point may be associated with multiple $(x, y, z)$ coordinates, i.e., images 604. Hence, image receptor 512 will retrieve from the look-up table the $(u, v)$ points and their associated $(x, y, z)$ coordinates. The retrieved results are then searched systematically to find a $(x, y, z)$ coordinate that satisfies or matches the $(s, t)$ and $(u, v)$ readings read by the respective receptors. In FIG. 5, it is shown that $(x, y, z)$ coordinate 610 satisfied both the $(s, t)$ and $(u, v)$ readings as such, it is determined that this coordinate is the $(x, y, z)$ coordinate of the point source 550.

In this embodiment of the invention, the corresponding points at locations $(s, t)$ and $(u, v)$ are defined as points that are perpendicular from the plane-of receptor 511 (along line 611) and 512 (along line 612) respectively to point source 550 (or target object).

Figure 7:
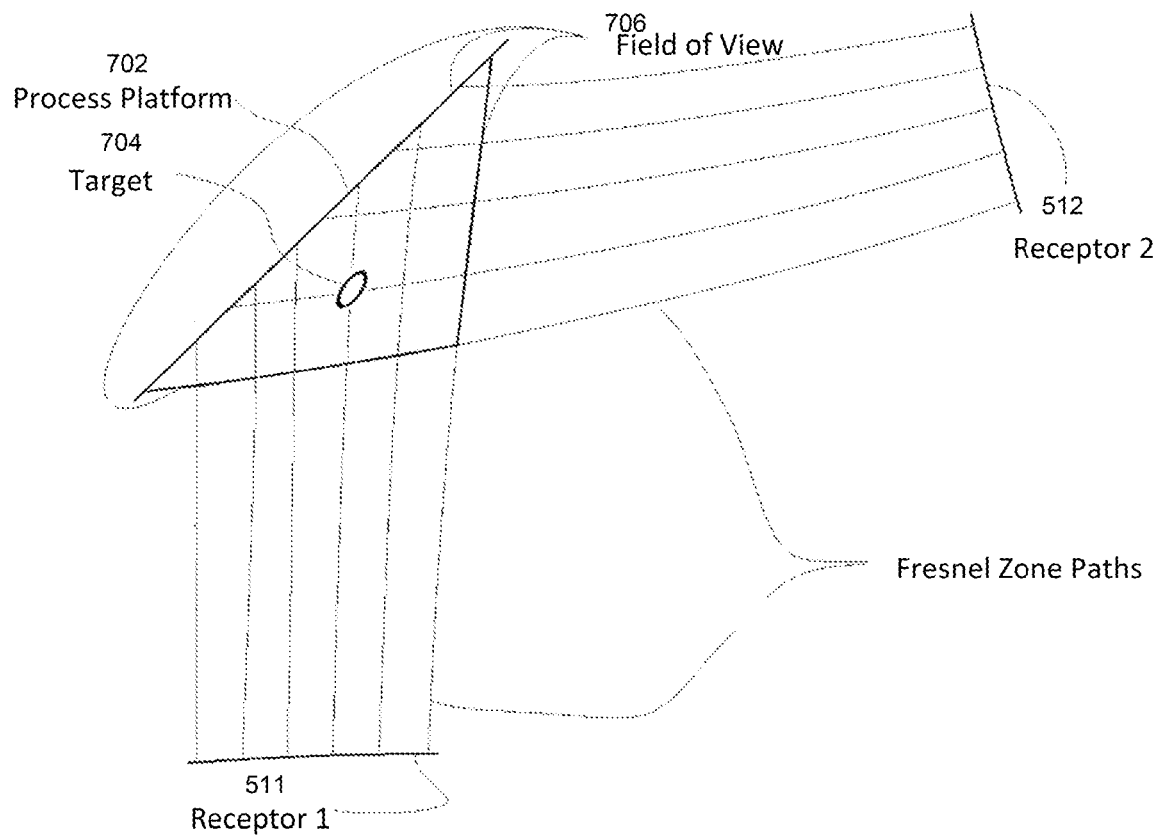
FIG. 7 illustrating the positioning and calibration of a target via the Fresnel zone paths of the image receptors in accordance with embodiments of the invention.

Due to the way the calibration table was generated, the calibration table would cover a large field of view 706 (as shown in FIG. 7). Hence, target centres provided at various distances from receptors 511 and 512 having identical $(s, t)$ or $(u, v)$ values may not precisely line up vertically from the planes of these receptors.

Figure 6:
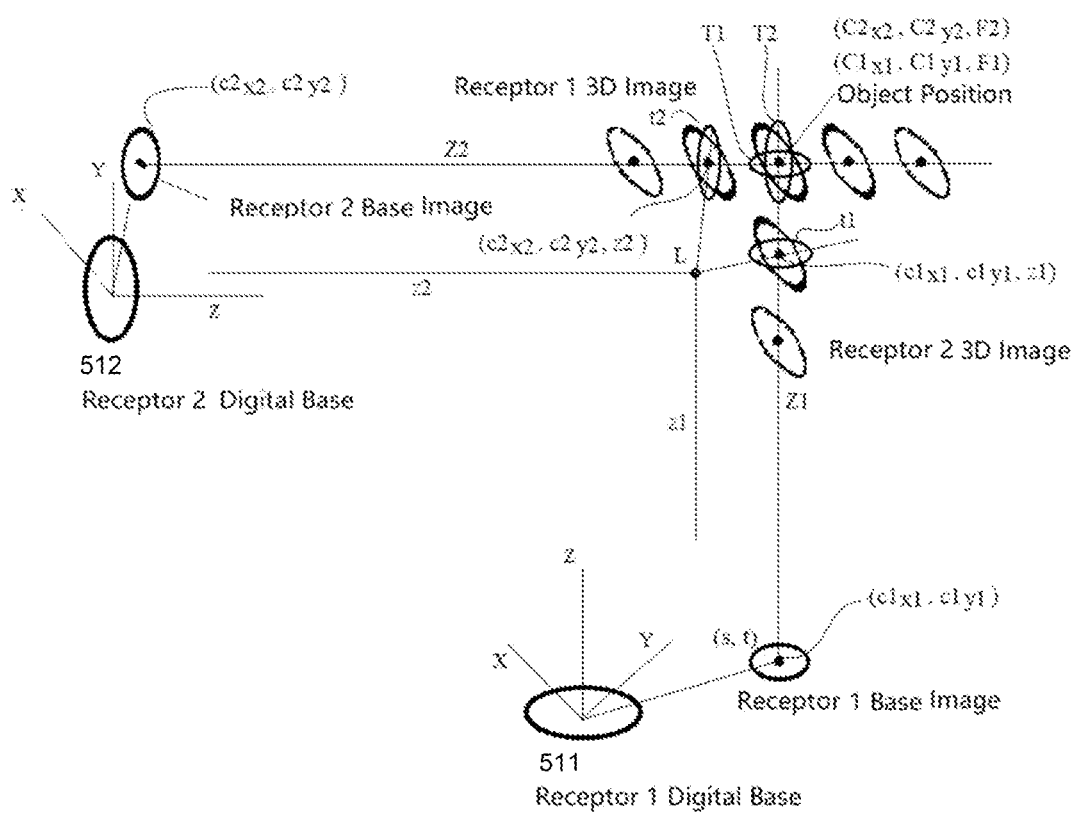
FIG. 6 illustrating an iterative method for the positioning and calibration of a target via the Fresnel zone paths of the image receptors in accordance with embodiments of the invention.

FIG. 6 illustrates an iterative method for the positioning and calibration of a target via the Fresnel zone paths of the image receptors in accordance with embodiments of the invention. In particular, it can be seen that the layers of 2D object images from receptor 511 align in the z direction of receptor 511 and are shown as the 3D images of receptor 511. The average of x and y values for the centres of the layers of 2D images in the z direction corresponding to receptor 511 are employed as $(s, t)$ values for the point of the object on the plane of receptor 511. The average x and y values for the centres of the layers of 2D images in the z direction corresponding to receptor 512 are employed as $(u, v)$ values for the point of the object on the plane of receptor 512. By doing so, the system generates the pair of 2D coordinates on the plane of receptor 511 and receptor 512, respectively.

FIG. 7 shows a plot of paths which correspond to points in each receptor's calibration table. Each point on each path that is associated with a receptor has identical $(s, t)$ or $(u, v)$ values. Based on the nonlinear characteristics of the calibration table, search algorithms are derived to follow the "Fresnel Zone Paths" to find the location of the target 704. For example, the path having the desired $(s, t)$ associated with receptor 511 is identified first. The search then traces along the path so as to minimise the discrepancy of the $(u, v)$ value associated with receptor 512. The method can then proceed recursively, employing interpolations to achieve a more refined search process.

Components of a Processing System

Figure 8:
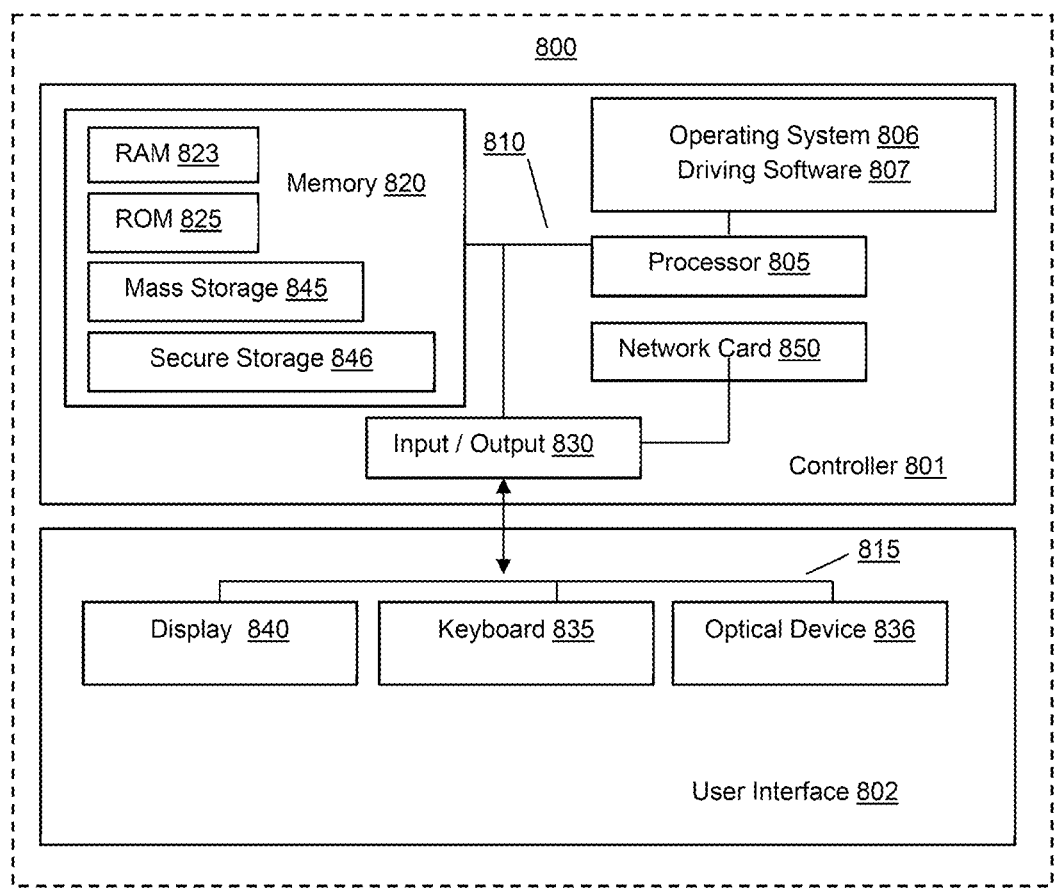
FIG. 8 illustrating a block diagram representative of components of processing system that may be provided within any computing devices for implementing embodiments in accordance with embodiments of the invention.

FIG. 8 illustrates a block diagram representative of components of processing system 800 that may be provided within any computing devices for implementing embodiments in accordance with embodiments of the invention. One skilled in the art will recognize that the exact configuration of each processing system provided within these modules and computing devices may be different and the exact configuration of processing system 800 may vary and FIG. 8 is provided by way of example only.

In embodiments of the invention, module 800 comprises controller 801 and user interface 802. User interface 802 is arranged to enable manual interactions between a user and module 800 and for this purpose includes the input/output components required for the user to enter instructions to control module 800. A person skilled in the art will recognize that components of user interface 802 may vary from embodiment to embodiment but will typically include one or more of display 840, keyboard 835 and optical device 836.

Controller 801 is in data communication with user interface 802 via bus group 815 and includes memory 820, processor 805, hardware/firmware 808 mounted on circuit boards that processes instructions and data for performing the method of this embodiment, an operating system 806, driving software 807, an input/output (I/O) interface 830 for communicating with user interface 802 and a communications interface, in this embodiment in the form of a network card 850. Network card 850 may, for example, be utilized to send data from electronic device 800 via a wired or wireless network to other processing devices or to receive data via the wired or wireless network. Wireless networks that may be utilized by network card 850 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 820 and driving software 807/operating system 806 are in data communication with CPU 805 via bus group 810. In embodiments of the invention, optical device 836 may be configured to be in direct communication with memory 820 via bus group 810. The memory components include both volatile and non-volatile memory and more than one of each type of memory, including Random Access Memory (RAM) 820, Read Only Memory (ROM) 825 and a mass storage device 845, the last comprising one or more solid-state drives (SSDs). Memory 820 also includes secure storage 846 for securely storing secret keys, or private keys. It should be noted that the contents within secure storage 846 are only accessible by a super-user or administrator of module 800 and may not be accessed by any user of module 800. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 820 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 805 may be provided by any suitable logic circuitry for receiving inputs, processing them in accordance with instructions stored in memory and generating outputs (for example to the memory components or on display 840). In this embodiment, processor 805 may be a single core or multi-core processor with memory addressable space. In one example, processor 805 may be multi-core, comprising—for example—an 8 core CPU.

The above is a description of embodiments of a system and process in accordance with the present invention as set forth in the following claims. It is envisioned that others may and will design alternatives that fall within the scope of the following claims.

The invention claimed is:

1. A system for determining, in a first and a second holographic image receptors' common three-dimensional (X, Y, Z) coordinate system, position of a point source provided within the first and second holographic image receptors' field of view, the system comprising:
the first holographic image receptor being configured to reconstruct a holographic image of the point source, whereby the holographic image corresponds to a two-dimensional location ($S_1$, $T_1$) on the plane of the first holographic image receptor;
the second holographic image receptor being configured to reconstruct a holographic image of the point source, whereby the holographic image corresponds to a two-dimensional location ($U_1$, $V_1$) on the plane of the second holographic image receptor;
a computing device communicatively coupled to the first and second holographic image receptors, the computing device being configured to:
identify, based on a calibration table of the first holographic image receptor and on a calibration table of the second holographic image receptor, a location ($X_1$, $Y_1$, $Z_1$) in the three-dimensional coordinate system that matches with the two-dimensional location ($S_1$, $T_1$) on the plane of the first holographic image receptor and the two-dimensional location ($U_1$, $V_1$) on the plane of the second holographic image receptor,
whereby the location ($X_1$, $Y_1$, $Z_1$) corresponds to the position of the point source,
wherein each holographic image receptor's calibration table was pre-generated by,
positioning a calibration point source at a plurality of calibration positions from the first and second holographic image receptors, whereby at each calibration position, the first and second holographic image receptors are configured to:
reconstruct a holographic image of the calibration point source on each image receptor's plane; and
for each image receptor, associate, in each image receptor's calibration table, a two-dimensional location of the holographic image on the plane of the image receptor with a location of the calibration point source as defined in the first and the second holographic image receptors' common three-dimensional (X, Y, Z) coordinate system.

2. The system according to claim 1 whereby a point of origin of the first and a second holographic image receptors' common three-dimensional (X, Y, Z) coordinate system is a fixed point provided between the first and second holographic image receptors.

3. The system according to claim 1 whereby the first holographic image receptor is configured to define an axis across the plane of the first holographic image receptor, whereby the two-dimensional location on the plane of the first holographic image receptor is defined as a point that has a shortest distance from the point source to the axis of the plane of the first holographic image receptor.

4. The system according to claim 1 whereby the reconstructing of the holographic image of the point source by the first holographic image receptor comprises the first holographic image receptor being configured to:
represent the holographic image by layers of 2D images in a Z axis of the first holographic image receptor, with centres of the layers of 2D images averaged into a two-dimensional location on the plane of the first holographic image receptor.

5. The system according to claim 1 whereby the reconstructing of the holographic image of the point source by the second holographic image receptor comprises the second holographic image receptor being configured to:
represent the holographic image by layers of 2D images in a Z axis of the second holographic image receptor, with centres of the layers of 2D images averaged into a two-dimensional location on the plane of the second holographic image receptor.

6. The system according to claim 1 whereby the second holographic image receptor is configured to define an axis across the plane of the second holographic image receptor, whereby the two-dimensional location on the plane of the second holographic image receptor is defined as a point that has a shortest distance from the point source to the axis of the plane of the second holographic image receptor.

7. A method for determining, in a first and a second holographic image receptors' common three-dimensional (X, Y, Z) coordinate system, position of a point source provided within the first and second holographic image receptors' field of view, the method comprising the steps of:
   reconstructing, using the first holographic image receptor, a holographic image of the point source, whereby the holographic image corresponds to a two-dimensional location $(S_1, T_1)$ on the plane of the first holographic image receptor;
   reconstructing, using the second holographic image receptor, a holographic image of the point source, whereby the holographic image corresponds to a two-dimensional location $(U_1, V_1)$ on the plane of the second holographic image receptor;
   identifying, using a computing device communicatively coupled to the first and second holographic image receptors, based on a calibration table of the first holographic image receptor and on a calibration table of the second holographic image receptor, a location $(X_1, Y_1, Z_1)$ in the three-dimensional coordinate system that matches with the two-dimensional location $(S_1, T_1)$ on the plane of the first holographic image receptor and the two-dimensional location $(U_1, V_1)$ on the plane of the second holographic image receptor,
   whereby the location $(X_1, Y_1, Z_1)$ corresponds to the position of the point source,
   wherein each holographic image receptor's calibration table was pre-generated by,
   positioning a calibration point source at a plurality of calibration positions from the first and second holographic image receptors, whereby at each calibration position, the first and second holographic image receptors are configured to:
   reconstruct a holographic image of the calibration point source on each image receptor's plane; and
   for each image receptor, associate, in each image receptor's calibration table, a two-dimensional location of the holographic image on the plane of the image receptor with a location of the calibration point source as defined in the first and the second holographic image receptors' common three-dimensional (X, Y, Z) coordinate system.

8. The method according to claim 7 whereby a point of origin of the first and a second holographic image receptors' common three-dimensional (X, Y, Z) coordinate system is at a fixed point between the first and second holographic image receptors.

9. The method according to claim 7 whereby the first holographic image receptor is configured to define an axis across the plane of the first holographic image receptor, whereby the two-dimensional location on the plane of the first holographic image receptor is defined as a point that has a shortest distance from the point source to the axis of the plane of the first holographic image receptor.

10. The method according to claim 7 whereby the second holographic image receptor is configured to define an axis across the plane of the second holographic image receptor, whereby the two-dimensional location on the plane of the second holographic image receptor is defined as a point that has a shortest distance from the point source to the axis of the plane of the second holographic image receptor.

11. The method according to claim 7 whereby the reconstructing of the holographic image of the point source by the first holographic image receptor comprises the first holographic image receptor being configured to:
   represent the holographic image by layers of 2D images in a Z axis of the first holographic image receptor, with centres of the layers of 2D images averaged into a two-dimensional location on the plane of the first holographic image receptor.

12. The method according to claim 7 whereby the reconstructing of the holographic image of the point source by the second holographic image receptor comprises the second holographic image receptor being configured to:
   represent the holographic image by layers of 2D images in a Z axis of the second holographic image receptor, with centres of the layers of 2D images averaged into a two-dimensional location on the plane of the second holographic image receptor.

* * * * *